Jan. 6, 1970

E. W. KREEGER

Re. 26,758

NEST AND STACK CONTAINERS

Original Filed June 27, 1966

3 Sheets-Sheet 1

INVENTOR.
ELSMER W. KREEGER

BY

Whittemore, Hulbert & Belknap

ATTORNEYS

Jan. 6, 1970 E. W. KREEGER Re. 26,758

NEST AND STACK CONTAINERS

Original Filed June 27, 1966

3 Sheets-Sheet 2

INVENTOR.
ELSMER W. KREEGER

BY

Whittemore, Hulbert & Belknap

ATTORNEYS

Jan. 6, 1970 E. W. KREEGER Re. 26,758

NEST AND STACK CONTAINERS

Original Filed June 27, 1966

3 Sheets-Sheet 3

INVENTOR
ELSMER W. KREEGER

BY

Whittemore, Hulbert & Belknap

ATTORNEYS

United States Patent Office

Re. 26,758

Reissued Jan. 6, 1970

26,758

NEST AND STACK CONTAINERS

Elsmer W. Kreeger, Orchard Lake, Mich., assignor to Pinckney Molded Plastics, Inc., Pinckney, Mich., a corporation of Michigan Original No. 3,380,625, dated Apr. 30, 1968, Ser. No. 560,692, June 27, 1966. Application for reissue Dec. 18, 1968, Ser. No. 786,506

Int. Cl. B65d *21/04*

U.S. Cl. 220—97

6 Claims

Matter enclosed in heavy brackets [ ] appears in the original patent but forms no part of this reissue specification; matter printed in italics indicates the additions made by reissue.

*ABSTRACT OF THE DISCLOSURE*

The container of this invention is adapted to nest in a similarly oriented lower container of identical construction or to stack thereon when reversed end for end. The container has diverging side and end walls. Each end wall has two laterally spaced outwardly bulging generally vertical flutes, and two laterally spaced saddles adjacent the upper edge thereof. The flutes have [feet] *seats* at their lower ends adapted to stack upon the saddles of a reversely oriented lower container. Guide means extend along the upper edge of each end wall so as to guide the [feet] *seats* of a reversely oriented upper container during transverse movement thereof to a stacked relationship.

SUMMARY OF THE INVENTION

This invention relates generally to containers and refers more particularly to nesting and stacking containers.

It is an essential object of this invention to provide an improved container of the nesting and stacking type, that is a container which is capable of nesting when empty with other containers of the same construction in a compact group which takes up relatively little space, and when filled with material is also capable of being stacked upon containers of the same construction in a manner such that the material in the containers will not be crushed.

Another object of the invention is to provide an improved container which is adapted to nest in a similarly oriented lower container of identical construction or to stack thereon upon being reversed end for end relative thereto.

Another object is to provide a nesting and stacking container which is especially adapted to be stacked upon a reversely oriented lower container of identical construction by being moved in a transverse direction over the lower container with a sliding motion into a superimposed position. Oftentimes loaded containers of the nesting and stacking type are stacked from the side as for example by a workman standing on a loading dock opposite the back end of a truck, and the stacking operation is greatly facilitated if the container being stacked can simply be engaged with the top of the supporting or lower container and then slid transversely across the lower container to a superimposed position stacked thereon.

Another object is to provide a container having guide means on the upper edges of the end walls so that a reversely oriented container of identical construction can be moved transversely thereover and guided into a superimposed stacked position by said guide means.

Another object is to provide a container in which each end wall has both a pair of outwardly convoluted flutes provided with [feet] *seats* at the lower ends and a pair of saddles adjacent their upper edges, the arrangement being such that the flutes fit within one another when similarly oriented containers are nested, and the [feet] *seats* on the lower ends of the flutes rest upon the saddles when two reversely oriented containers are stacked.

Other objects and features of the invention will become apparent as the description proceeds, especially when taken in conjunction with the accompanying drawings, wherein:

FIGURE 1 is a top plan view of a nesting and stacking container constructed in accordance with my invention.

FIGURE 2 is a longitudinal sectional view showing three containers of identical construction with the top container nesting in the middle container and the middle container stacked on the bottom container, the section being taken with respect to the bottom container on the line 2—2 in FIGURE 1. It will be understood that the top container is similarly oriented with respect to the middle container, and the middle container is reversely oriented, that is turned end-for-end, with respect to the bottom container.

Figure 1:
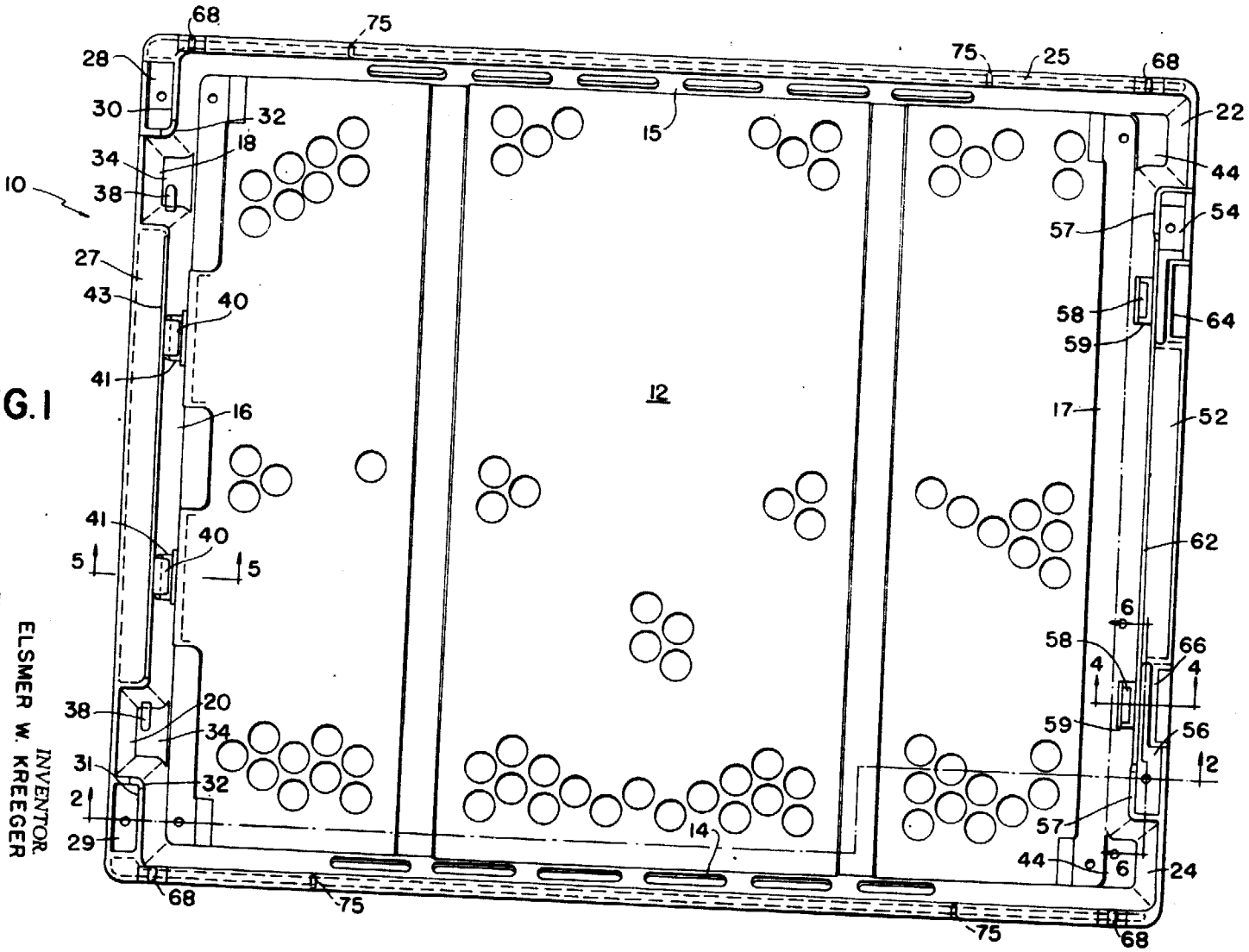

Referring now more particularly to the drawings, the container is of generally rectangular form and designated by the numeral 10. All of the containers shown in the various views are of identical construction. The container 10 has a generally rectangular horizontal bottom wall 12, longitudinally extending side walls 14, 15, extending upwardly in diverging relation to each other from opposite sides of the bottom wall, and transversely extending end walls 16, 17 extending upwardly in diverging relation to each other from opposite ends of the bottom wall and joined to the adjacent ends of the side walls. The end walls and side walls diverge in order to facilitate nesting, and preferably they diverge at the same angle. The container may be made of any suitable material such, for example, as fiber glass or polyethylene, and may be used to contain and transport any material such as a plurality of loaves of bread. Obviously soft contents such as bread may be easily crushed, and therefore a sturdy reliable container of the type herein described, which is capable of stacking with other containers in a manner that places no pressure on the contents of the containers, is highly desirable.

The end walls 16, 17 for the most part are flat as will be apparent. However, they each have two laterally spaced, outwardly convoluted generally vertical flutes 18, 20, 22 and 24. The flutes 18 and 20 of end wall 16 are spaced inwardly from the side walls, and the flutes 22 and 24 of end wall 17 are adjacent to the side walls.

There is a rim which extends around all four walls of the container at their upper edges which is continuous and is designated generally by the reference character 25. Along the side walls of the container the rim has a depending flange 26 for strength purposes. Along end 16 it will be noted that between flutes 18 and 20 the rim is substantially flat and horizontal, this section being designated 27, and is at the level of the upper extremities of the flutes. Rim section 27 has a downturned flange for strength. Outwardly beyond the flutes 18 and 20 of end wall 16, the rim is formed by downwardly concave recesses defining pockets or saddles 28, 29. The *inner edges of the* saddles 28, 29 are [surrounded] *defined* by upstanding ridges 30, 31 which are disposed in the flat horizontal plane of rim section 27, and are notched or cut away at 32. The purpose of these notches, *which extend across the adjacent side walls of flutes 18 and 20,* will be explained more fully hereinafter.

Referring further to the flutes 18 and 20 of end wall 16, it will be noted that the lower ends of these flutes are closed by walls *providing seats* 34 and, at [the] *their* outer extremities [of the bottom walls], the [flutes are provided with depending] *seats include depending portions which provide* feet 36. The [lower end walls] *seats* 34 of the flutes are slotted as indicated at 38 to clear the ends of rail 62 of wall 17 in a stacked condition of the containers as viewed in FIGURE 3.

Figure 5:
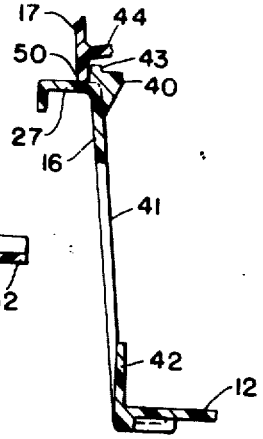
FIGURE 5 is a sectional view taken on the line 5—5 in FIGURE 1, and shows the foot *portion of the seat* of an upper container engaging the rim of a lower container during sliding of the upper container across the lower container to a stacked position thereon.

On the inner side of end wall 16 between the flutes, there are a pair of laterally spaced supporting ledges 40 which are located adjacent to the upper edge of the end wall. The purpose of these ledges is to facilitate the transverse movement of one container over another to a stacked relationship as will appear more fully hereinafter. Below these ledges the end wall 16 is formed with vertical slots 41 and the portions 42 of the end wall 16 beneath the slots is pushed inwardly as shown in FIGURE 5 so as to be substantially vertical.

It will be noted that the end wall 16 between the flutes is provided at its upper edge with an elongated ridge or rail 43 which projects above the rim portion 27 and extends substantially from one flute to the other. This rail together with the flat horizontal rim section 27 provide guide means to facilitate moving one container relative to another to a stacked position.

Referring now to the end wall 17, this end wall is formed at its ends with the outwardly convoluted flutes 22 and 24 which are closed at their lower ends by walls *providing seats* 44. The [flutes have] *seats include depending portions which provide* feet 50 [depending from walls 44] at the outer edges thereof. The flutes 22 and 24 are directly opposite saddles 28 and 29 of the end wall 16.

The portion of the rim 25 between flutes 22 and 24 is a substantially flat horizontal section designated 52, and is at the level of the upper extremities of the flutes. Rim section 52 has a downturned flange for strength. Inwardly of the flutes 22 and 24 of end wall 17, the rim is formed by downwardly concave recesses defining pockets or saddles 54 and 56. The *inner edges of the* saddles 54 and 56 are [surrounded] *defined* by upstanding ridges 57 disposed in the flat horizontal plane of rim section 52. The wide portions of the saddles adjacent the flutes are located directly opposite the flutes 18 and 20 of end wall 16.

Figure 4:
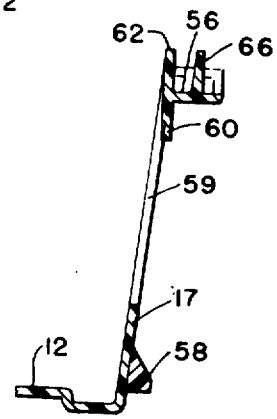
FIGURE 4 is a sectional view taken on the line 4—4 in FIGURE 1.

On the outer side of end wall 17 between the flutes, there are a pair of laterally spaced lugs 58 which are located adjacent to the lower edge of the end wall. These lugs cooperate with the ledges 40 to facilitate stacking of two containers by moving one transversely over the other, as will appear more fully hereinafter. Above these lugs the end wall 17 is formed with vertical slots 59 and the portion 60 of the end wall 17 above the slots is pushed outwardly to a substantially vertical position, as shown in FIGURE 4.

Referring further to the end wall 17, there is an elongated upstanding rail 62 which extends from about the mid-point of one saddle to about the mid-point of the other saddle along the upper edge of the end wall. This rail cooperates with the flat horizontal portion 52 of the rim to provide a guide means to facilitate transversely moving one container into a stacked position with respect to another.

The rim section 52 has a pair of upwardly projecting, laterally spaced abutments 64 and 66 which are spaced outwardly from the rail 62. These abutments extend along the inner or adjacent portions of the saddles. These inner or adjacent portions of the saddles, located between abutments 64, 66 and rail 62, are narrower than the outer portions of the saddles.

Along the opposite side walls of the container the rim is provided with four upstanding protuberances 68, two on each side. The protuberances are located near the end walls and are provided to guide the bottom of the container as it slides transversely over a lower reversely oriented container of identical construction to a stacked position.

The side walls 14 and 15 of the container have nesting abutments 75 on their outer surfaces which extend vertically from the rim downward a short distance. Preferably, there are two laterally spaced nesting abutments on each side wall.

Figure 2:
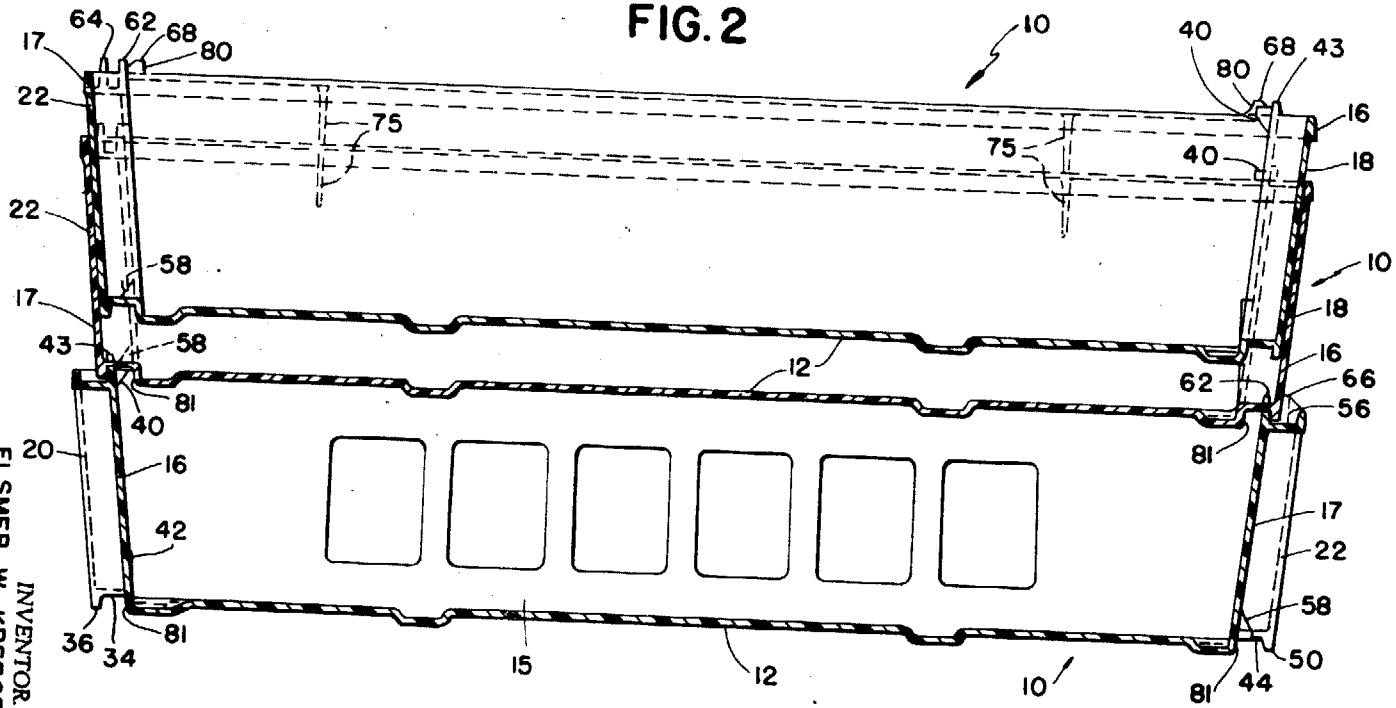
Figure 3:
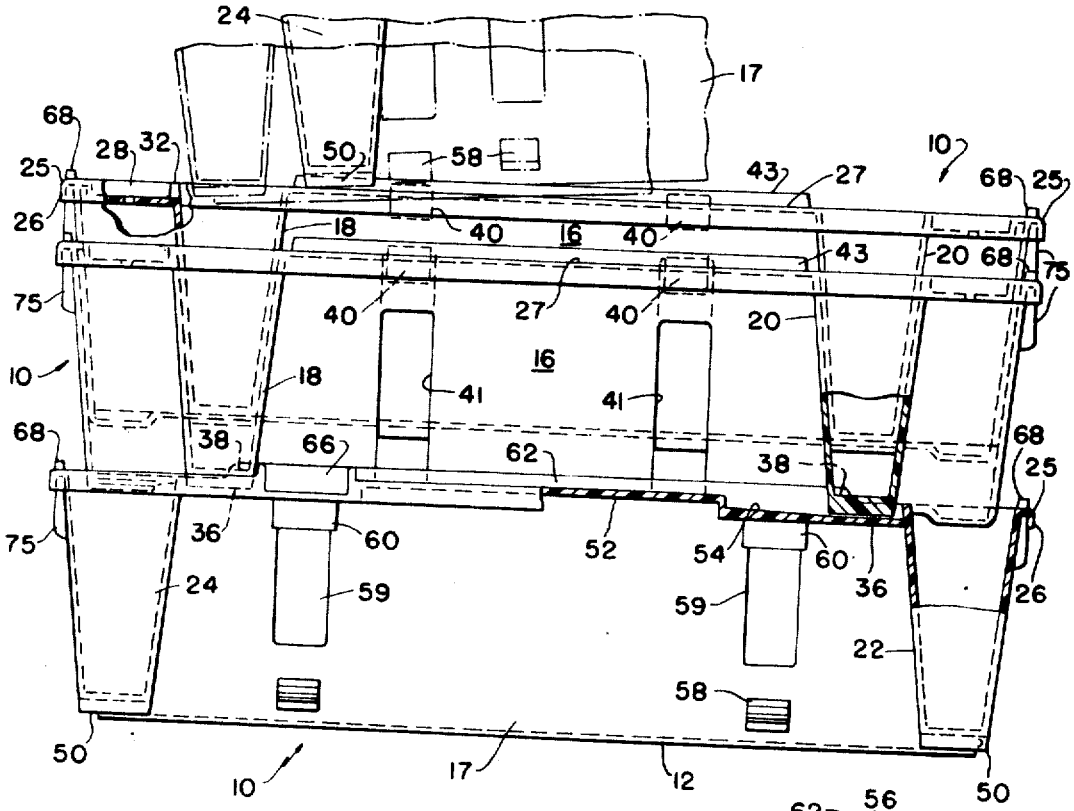
FIGURE 3 is an end elevational view with parts in section showing a bottom container having a container stacked thereon, a third container nested in the stacked container, and fragmentarily showing a top container in intermediate positions during transverse sliding movement thereof into stacked relation with respect to the nested container.
Figure 6:
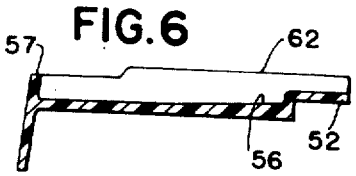
FIGURE 6 is a sectional view taken on the line 6—6 in FIGURE 1.

Referring to FIGURES 2 and 3, it is evident how the containers of like construction nest with one another. The two upper containers in FIGURE 2 are shown nested, and the two middle containers in FIGURE 3 are shown nested. Two containers will nest when similarly oriented. The side and end walls diverge to facilitate nesting. The flutes of one container fit within the flutes of the other container. During movement to nested position, the slots or clearances 41 in the end wall 16 of the upper container clear the ledges 40 of the lower container, and the pushed-in portions 42 provide for greater initial clearance. Also, the slots 59 in the end wall 17 of the lower container clear the lugs 58 of the upper container, the pushed-out portions 60 providing greater initial clearance. The nesting abutments 75 on the side walls of the upper container engage the rim of the lower container to limit the extent of nesting and thus prevent the containers from wedging together.

When stacking two containers of like construction, the upper container is reversely oriented, that is turned end for end, with respect to the lower container. In this relationship of the containers, and when the upper container is in register with and above the lower container, the [feet 36] *seats 34* on the flutes of end wall 16 will register with the wide portions of saddles 54 and 56 of end wall 17 of the lower container, and the [feet 50] *seats 44* on the flutes of end wall 17 will register with the saddles 28 and 29 of end wall 16 of the lower container. The upper container may then be lowered into engagement with the lower container so that the [feet] substantially horizontal undersurfaces of the seats of the upper container will engage [in] *and rest upon the inner edges or ridges 30, 31, 57 of* the saddles of the lower container [. Since the saddles are surrounded by upstanding ridges the feet of the upper container are prevented from horizontal movement and hence] *and the feet 36, 50 will extend down into the pockets formed by the saddles to prevent horizontal movement of the upper container, whereby* the upper container is supported in a stable stacked relationship upon the lower container, as viewed in FIGURES 2 and 3. Preferably, the feet do not touch the bottoms of the saddles [, but rather engage over the ridges 31 and 57 surrounding the saddles, with the bottom walls 34 and 44 of the flutes resting on the upper edges of the ridges].

Under some circumstances the loading of containers in stacked relation to one another must be carried out from the side, and this can be particularly difficult where the containers are loaded as they normally will be when stacked. According to the present invention the upper container may be very readily moved to a stacked position on the lower container by sliding the upper container transversely across the lower container until the feet of the upper container drop into the pockets formed by their saddles in properly stacked position. To accomplish this, the upper container, reversed end for end relative to the lower container, is lifted to a level above the lower container with one foot *portion of a seat* on each end wall of the upper container adjacent a side thereof resting upon and engaged with the guide means of the lower container. As already stated, the guide means consists of the horizontal rim section 27 and rail 43 on end wall 16, and the horizontal rim section 52 and rail 62 on end wall 17. The feet will engage and rest upon the rim sections 27, 52 and will be prevented from longitudinal movement on the lower container by the rails (FIG. 5). Initially, the major portion of the upper container may be disposed laterally to one side of the lower container. The upper container may then be slid sideways or transversely across the top of the lower container, being guided by the guide means aforesaid The upper container fragmentarily shown in FIGURE 3, appears in solid lines in an intermediate position during movement to a stacked condition. The end wall fragmentarily shown is the end wall 17. When the foot on this end wall reaches the position overlying the flute of the lower container, as shown in dotted lines in FIGURE 3, that foot will no longer be supported by the guide means. At this point the lug 58 of the upper container overlies and rests on [ridge] *ledge* 40 of the lower container to prevent the foot of the upper container from dropping into the flute of the lower container. Hence these ledges and lugs are provided to carry the lead foot of the end wall 17 of the upper container over an open flute of the lower container before it reaches the saddle at the end of the lower container. The notches 32 provided in the saddles 28, 29 facilitate the entry of the foot of an upper container into *the pocket formed by it saddle.*

When the upper container is in the position fragmentarily shown in dotted lines at the top of FIGURE 3, the rail 43 no longer guides the end wall 17 of the upper container and hence the upper container could move longitudinally were it not for the provision of one of the abutments 64, 66 on end movement engages the outer side of the lead foot of the end wall 16 of the upper container to prevent such longtudinal movement.

During the transverse movement of an upper container to a stacked position, the leading foot on the end wall 16 of the upper container simply drops into *the pocket formed by* its saddle when stacked, and does not have to pass over an intervening flute.

When the leading feet of the upper container [engage] *drop into the pockets formed by* their saddles in properly stacked position, the trailing side of the upper container may be released to permit the other two feet to drop into *the pockets formed by* their saiddles. When stacked, the feet extend into *the pockets formed by* the saddles but preferably do not engage the bottom of the [saddles] *pockets,* as seen in FIGURE 2. Preferably, *the substantially horizontal undersurfaces only of the seats 34, 44 of* the stacked container rest[s] upon the [surrounding] *inner edges or* ridges *30,* 31, 57, of the saddles.

During the transverse movement of the upper container to stacked position, the inner surfaces 80 of protuberances 68 projecting from the rim of the side walls of the lower container engage the outer surfaces 81 of the end walls of the upper container near the bottom thereof to assist in guiding the upper container. These surfaces of the protuberances and end walls are indicated in FIGURE 2.

In the stacked position of two containers, the ends of the rail 62 project into the slots 38 in the bottom walls 34 of flutes 18 and 20 (FIG. 3).

It will be understood that the upper container may be moved laterally across a lower container to a stacked position from either side. Only one pair of ledges and lugs 40, 58 will however be operable during stacking depending upon the direction the container is slid to a stacked position. Also, only one of the abutments 64, 66 for preventing longitudinal movement will be operable.

What I claim as my invention is:

1. An upwardly open container adapted to nest in a similarly oriented lower container of identical construction or to stack thereon upon being reversed end-for-end relative thereto, comprising a generally rectangular bottom wall, two longitudinal side walls extending upwardly in diverging relation to each other from opposite sides of said bottom wall, two transverse end walls extending upwardly in diverging relation to each other from opposite ends of said bottom wall and joined to adjacent ends of said side walls, each end wall having two laterally spaced outwardly bulging, generally vertical flutes, each end wall also having two laterally spaced saddles adjacent the upper edge thereof, said saddles being in the form of upwardly opening pockets, the flutes of each end wall being respectively opopsite the saddles of the other end wall, the saddles of one end wall being located between the flutes thereof and the flutes of the other end wall being respectively opposite the saddles of the other end having [feet] *seats* at their lower ends adapted to [project downwardly into and] stack upon the *upper edges of the* saddles of a reversely oriented lower container of identical construction, *said seats including feet adapted to extend downwardly into the last mentioned saddles,* and guide means along the upper edge of each end wall, the foot of one flute of one end wall and the foot of one flute of the other end wall of a reversely oriented upper container of identical construction being simultaneously engageable with said guide means during transverse movement thereof to a stacked relationship, said guide means on each end wall comprising a horizontal surface and an upstanding rail, said horizontal surface and rail on the end wall having the saddles between the flutes extending from saddle to saddle thereof and said horizontal surface and rail on the other end wall extending from flute to flute thereof, said horizontal surfaces being adapted to engage and slidably support feet of a reversely oriented upper container of identical construction during transverse movement thereof to a stacked relationship and said rails being adapted to guide said last mentioned feet.

2. The container defined in claim 1, wherein said feet on one end wall are spaced from the feet on the opposite end wall a distance greater than the spacing between said rails so that said rails guide the inner sides of feet of a reversely oriented upper container of identical construction during transverse movement thereof to a stacked relationship.

3. The container defined in claim 2, wherein the end wall having the saddles between the flutes has an upstanding abutment on its upper edge spaced outwardly from the rail thereof so as to guide the outer side of the foot of a reversely oriented upper container of identical construction during transverse movement thereof to a stacked relationship, said upstanding abutment being positioned with respect to a flute of the end wall having the flutes between the saddles so as to prevent longitudinal movement of said upper container when one of the feet of the latter registers with said last-mentioned flute during said transverse movement of said upper container.

4. The container defined in claim 3, wherein said end wall having said first-mentioned upstanding abutment has a second upstanding abutment on its upper edge spaced outwardly from the rail thereof and located with respect to the other flute of the end wall having the flutes between the saddles so as to prevent longitudinal movement of said upper container when a foot of the latter registers with said other flute during said transverse movement of said upper container.

5. The container defined in claim 1, wherein the end wall of said container having the flutes between the saddles has a support ledge on the inner side adjacent the upper edge thereof, the opposite end wall has a lug on the outer side adjacent the lower edge thereof, said ledge being adapted to engage and support the lug of a reversely oriented upper container of identical construction during transverse movement thereof to a stacked relationship when one of the feet of the upper container registers with a flute of the end wall having the flutes between the saddles.

6. An upwardly opening container adapted to nest in a similarly oriented lower container of identical construction or to stack thereon upon being reversed end-for-end relative thereto, comprising a generally rectangular bottom wall, two longitudinal side walls extending upwardly in diverging relation to each other from opposite sides of said bottom wall, two transverse end walls extending upwardly in diverging relation to each other from opposite ends of said bottom wall and joined to adjacent ends of said side walls, each end wall having two laterally spaced outwardly bulging, generally vertical flutes, each end wall also having two laterally spaced saddles adjacent the upper edge thereof, the flutes of each end wall being respectively opposite the saddles of the other end wall, the saddles of one end wall being located between the flutes thereof and the flutes of the other end wall being located between the saddles thereof, said flutes having [feet] *seats* at their lower ends adapted to stack upon the saddles of a reversely oriented lower container of identical construction, elongated guide means along the upper edge of the end wall having the saddles between the flutes extending from saddle to saddle thereof, elongated guide means along the upper edge of the end wall having the flutes between the saddles extending from flute to flute thereof, the [foot] *seat* of one flute of one end wall and the [foot] *seat* of one flute of the other end wall of a reversely oriented container of identical construction being simultaneously engageable with both said guide means during transverse movement thereof to a stacked relationship.

References Cited

The following references, cited by the Examiner, are of record in the patented file of this patent or the original patent.

UNITED STATES PATENTS

| | | | |
|---|---|---|---|
| 3,081,897 | 3/1963 | Livingston | 220—97 X |
| 3,147,882 | 9/1964 | Waters | 220—97 |

FOREIGN PATENTS

| | | |
|---|---|---|
| 1,368,284 | 6/1964 | France. |

GEORGE E. LOWRANCE, Primary Examiner

PO-1050
(5/69)

UNITED STATES PATENT OFFICE
CERTIFICATE OF CORRECTION

Patent No. Re. 26,758 Dated January 6, 1970

Inventor(s) ELSMER W. KREEGER

It is certified that error appears in the above-identified patent and that said Letters Patent are hereby corrected as shown below:

Column 6, line 13, for "opopsite" read -- opposite --:

line 16, for "respectively opposite the saddles of the other end" read -- located between the saddles thereof, said flutes --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents